(12) United States Patent
Nomura

(10) Patent No.: US 10,922,835 B2
(45) Date of Patent: Feb. 16, 2021

(54) VEHICLE EXTERIOR ENVIRONMENT RECOGNITION APPARATUS AND VEHICLE EXTERIOR ENVIRONMENT RECOGNITION METHOD

(71) Applicant: SUBARU CORPORATION, Tokyo (JP)

(72) Inventor: Naoki Nomura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 333 days.

(21) Appl. No.: 15/967,085

(22) Filed: Apr. 30, 2018

(65) Prior Publication Data

US 2018/0357782 A1 Dec. 13, 2018

(30) Foreign Application Priority Data

Jun. 9, 2017 (JP) .............................. JP2017-114441

(51) Int. Cl.
*G06K 9/00* (2006.01)
*G06T 7/70* (2017.01)
*G06T 7/73* (2017.01)

(52) U.S. Cl.
CPC ............ *G06T 7/70* (2017.01); *G06K 9/00805* (2013.01); *G06T 7/73* (2017.01); *G06T 2207/10012* (2013.01); *G06T 2207/30261* (2013.01)

(58) Field of Classification Search
CPC ... G06T 7/70; G06T 7/73; G06T 2207/10012; G06T 2207/30261; G06K 9/00805
See application file for complete search history.

(56) References Cited

U.S. PATENT DOCUMENTS

| 2011/0010023 | A1* | 1/2011 | Kunzig ................ G05D 1/0234 701/2 |
| 2011/0022269 | A1* | 1/2011 | Nakazono ................ G08G 1/14 701/41 |
| 2012/0035788 | A1* | 2/2012 | Trepagnier ............ B60W 10/20 701/3 |
| 2016/0275694 | A1* | 9/2016 | Nomura ............... H04N 13/204 |
| 2017/0057499 | A1 | 3/2017 | Kim |
| 2018/0060671 | A1* | 3/2018 | Nomura ............. G06K 9/00791 |
| 2018/0118204 | A1* | 5/2018 | Ito ..................... B60W 30/0956 |

FOREIGN PATENT DOCUMENTS

| JP | 2007-265451 A | 10/2007 |
| JP | 5113656 B2 | 1/2013 |
| JP | 2013-109457 A | 6/2013 |
| JP | 2017-033152 A | 2/2017 |

OTHER PUBLICATIONS

Japanese Office Action issued in corresponding Japanese Patent Application No. 2017-114441, dated Apr. 23, 2019, with English Translation.

\* cited by examiner

*Primary Examiner* — Shefali D Goradia
(74) *Attorney, Agent, or Firm* — McDermott Will & Emery LLP

(57) ABSTRACT

A vehicle exterior environment recognition apparatus includes an object identifier and a barrier setting unit. The object identifier is configured to identify an object in a detected region ahead of an own vehicle. The barrier setting unit is configured to set a barrier located at a closest end of the object, with a relative distance from the object to the own vehicle in a traveling direction of the own vehicle being shortest at the closest end. The barrier is devoid of avoidability by the own vehicle with use of a traveling mode of the own vehicle.

5 Claims, 10 Drawing Sheets

VEHICLE EXTERIOR ENVIRONMENT RECOGNITION APPARATUS AND VEHICLE EXTERIOR ENVIRONMENT RECOGNITION METHOD

CROSS-REFERENCE TO RELATED APPLICATIONS

The present application claims priority from Japanese Patent Application No. 2017-114441 filed on Jun. 9, 2017, the entire contents of which are hereby incorporated by reference.

BACKGROUND

The technology relates to a vehicle exterior environment recognition apparatus and a vehicle exterior environment recognition method that perform a collision avoidance control of a vehicle in accordance with vehicle exterior environment.

A technique has been known that includes detecting an object located ahead of an own vehicle, e.g., a preceding vehicle, and controlling the own vehicle to avoid collision with the object (i.e., a collision avoidance control). For example, reference is made to Japanese Patent No. 5113656.

SUMMARY

An aspect of the technology provides a vehicle exterior environment recognition apparatus that includes an object identifier and a barrier setting unit. The object identifier is configured to identify an object in a detected region ahead of an own vehicle. The barrier setting unit is configured to set a barrier located at a closest end of the object, with a relative distance from the object to the own vehicle in a traveling direction of the own vehicle being shortest at the closest end. The barrier is devoid of avoidability by the own vehicle with use of a traveling mode of the own vehicle.

An aspect of the technology provides a vehicle exterior environment recognition method. The vehicle exterior environment recognition method includes: identifying an object in a detected region ahead of an own vehicle; and setting a barrier located at a closest end of the object, with a relative distance from the object to the own vehicle in a traveling direction of the own vehicle being shortest at the closest end. The barrier is devoid of avoidability by the own vehicle with use of a traveling mode of the own vehicle.

An aspect of the technology provides a vehicle exterior environment recognition apparatus that includes circuitry. The circuitry is configured to identify an object in a detected region ahead of an own vehicle, and set a barrier located at a closest end of the object, with a relative distance from the object to the own vehicle in a traveling direction of the own vehicle being shortest at the closest end. The barrier is devoid of avoidability by the own vehicle with use of a traveling mode of the own vehicle.

DETAILED DESCRIPTION

Figure 1:
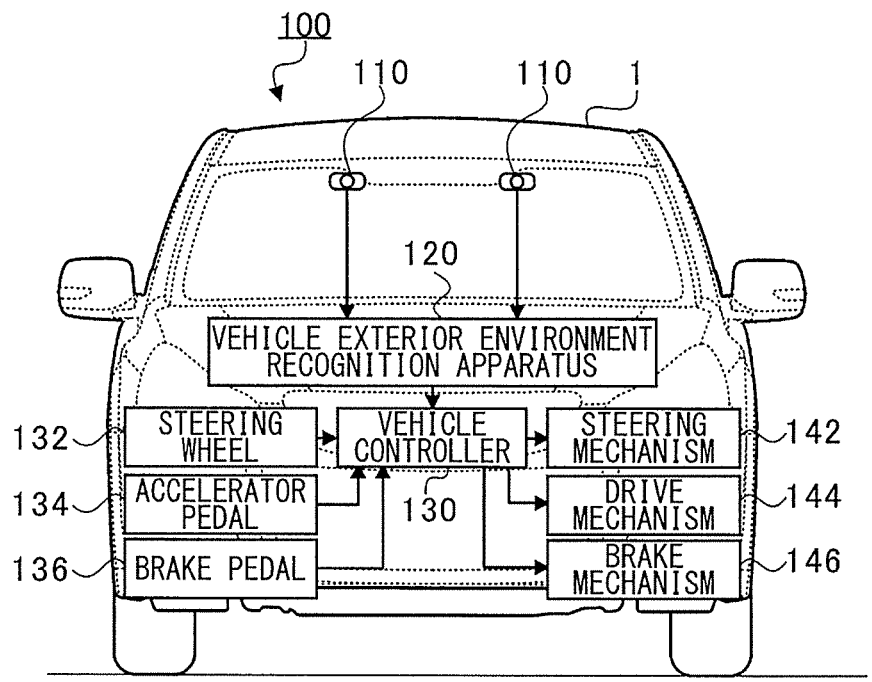
FIG. 1 is a block diagram illustrating a relation of connection in a vehicle exterior environment recognition system.

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

An example of a collision avoidance control may include: setting a wall at a rear surface of a preceding vehicle as an object; making a determination as to whether or not collision with the wall set is avoidable (i.e., a collision avoidance determination); and making an emergency brake operation in response to a result of the collision avoidance determination that the collision is unavoidable, to avoid the collision with the object. The wall may be set, for example, between right and left taillights. In this example, it is possible to appropriately avoid collision with the preceding vehicle, in a case where the preceding vehicle is heading in the same traveling direction as that of an own vehicle.

However, in a case where the traveling direction of the preceding vehicle is slanted obliquely frontward with respect to the traveling direction of the own vehicle, it follows that not only the rear surface of the preceding vehicle but also a side surface of the preceding vehicle are visible to the own vehicle. In this case, even if a determination is made that the collision with the wall set is avoidable, there is, actually, possibility that the own vehicle will collide with the preceding vehicle. For example, the own vehicle may pass by the wall set, to collide with the side surface of the preceding vehicle.

In order to prevent such a situation, a possible countermeasure may be, for example, to set the wall along an entirety of a range visible to the own vehicle, out of the preceding vehicle, e.g., between right and left ends of the preceding vehicle as viewed from the own vehicle. In this example, it is possible to prevent the own vehicle from colliding with the side surface of the preceding vehicle that is directed in a slanted direction with respect to the own vehicle. In this example, however, in a case where the own vehicle tries to pass by the side surface of the preceding vehicle, a determination may be made that the collision with the wall set is unavoidable, causing possibility of the emergency brake operation. In other words, this example involves making the emergency brake operation excessively, regardless of considerable low possibility of the collision of the own vehicle with the preceding vehicle.

As described, depending on a posture of the object such as the preceding vehicle, and depending on the setting of the wall, i.e., information used in making the collision avoidance determination with the object, there occurs deviation of the result of the collision avoidance determination from presence or absence of actual collision.

It is desirable to provide a vehicle exterior environment recognition apparatus and a vehicle exterior environment recognition method that make it possible to appropriately set information involved in making a collision avoidance determination with an object such as a preceding vehicle, regardless of a posture of the object.

[Vehicle Exterior Environment Recognition System 100]

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller (e.g., an engine control unit (ECU)) 130. The implementation may include two image-capturing units 110 without limitation.

The two image-capturing units 110 each may include an imaging device such as, but not limited to, a charge-coupled device (CCD) and a complementary metal-oxide semiconductor (CMOS). The image-capturing units 110 may each be able to capture an image of vehicle exterior environment ahead of the own vehicle 1, and to generate a luminance image that includes at least information on luminance. The luminance image may be a color image or a monochrome image. The two image-capturing units 110 may be so disposed that their respective optical axes become substantially parallel to each other along the traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may be an image that captures an object present in a detected region ahead of the own vehicle 1. Non-limiting examples of the objects to be recognized by the image-capturing units 110 may include an object that is present independently, and an object as a part of the independently-present object. Non-limiting examples of the independently-present object may include a bicycle, a pedestrian, a vehicle, a traffic light, a road (or a traveling path), a road sign, a guardrail, and a building. Non-limiting examples of the object as a part of the independently-present object may include a wheel of a bicycle.

The vehicle exterior environment recognition apparatus 120 may obtain the luminance images from the respective image-capturing units 110, and derive parallax information with use of so-called pattern matching. The pattern matching may involve extracting any block (e.g., an array of 4 pixels horizontally by 4 pixels vertically) from one of the luminance images, and searching for a corresponding block in another of the luminance images. The parallax information may include a parallax, and an on-screen position of any block. The on-screen position indicates a position of any block on a screen. In this implementation, the term "horizontally" refers to an on-screen lateral direction of the captured image, while the term "vertically" refers to an on-screen vertical direction of the captured image. A possible example of the pattern matching may be to compare a pair of images in terms of luminance (Y) block by block. Non-limiting examples may include techniques such as SAD (Sum of Absolute Difference), SSD (Sum of Squared intensity Difference), and ZNCC (Zero-mean Normality Cross Correlation). The SAD includes obtaining differences in the luminance. The SSD includes using the differences squared. The ZNCC includes obtaining similarity of variance values obtained by subtracting an average value from luminance values of pixels. The vehicle exterior environment recognition apparatus 120 may perform such a block-by-block parallax derivation process, for all blocks displayed in the detected region of, for example, 600 pixels by 200 pixels. In this implementation, one block is assumed to be the array of 4 pixels by 4 pixels, but the number of the pixels inside one block may be set at any value.

It is to be noted that the vehicle exterior environment recognition apparatus 120 is able to derive the parallax for each of the blocks, but the vehicle exterior environment recognition apparatus 120 is not able to recognize what kind of object each of the blocks belongs to. The block serves as a unit of detection resolution. It follows, therefore, that the parallax information is derived not by the object but independently by the detection resolution in the detected region, e.g., by the block. In this implementation, an image with which the parallax information thus derived is correlated is referred to as a distance image, in distinction from the luminance image as mentioned above.

Figure 2A:
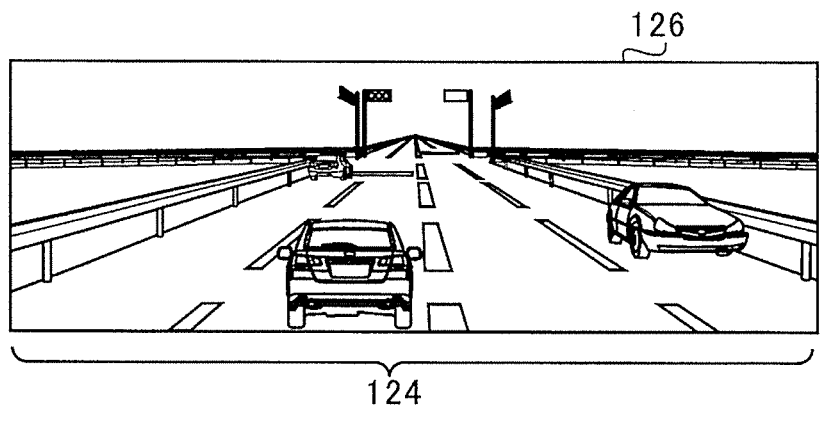
FIGS. 2A and 2B respectively describe a luminance image and a distance image.
Figure 2B:
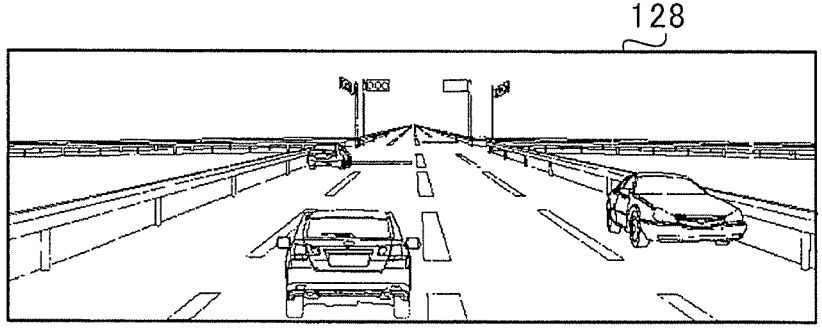

FIGS. 2A and 2B respectively describe the luminance image 126 and the distance image 128. FIG. 2A describes a non-limiting example in which the luminance image 126 as illustrated in FIG. 2A is generated for the detected region 124 by means of the two image-capturing units 110. Note that FIG. 2A schematically illustrates only one of the two luminance images 126 generated by the respective image-capturing units 110 for easier understanding. The vehicle exterior environment recognition apparatus 120 may obtain the parallax for each of the blocks from the luminance images 126 to form the distance image 128 as illustrated in FIG. 2B. Each of the blocks in the distance image 128 may be associated with the parallax of the relevant block. For description purpose, each of the blocks for which the parallax is derived is denoted by a black dot.

Moreover, the vehicle exterior environment recognition apparatus 120 may perform grouping of blocks, as an object. The grouping may be made with the use of luminance values, i.e., color values, based on the luminance image 126, and with the use of three-dimensional positional information in real space. The three-dimensional positional information may be calculated on the basis of the distance image 128, and include a relative distance to the own vehicle 1. The blocks to be grouped may be of equal color values, and of close relative distances included in the three dimensional positional information. The vehicle exterior environment recognition apparatus 120 may identify which specific object the object in the detected region ahead of the own vehicle 1 corresponds to. Non-limiting example of the specific object may include a preceding vehicle. Note that the relative distance as mentioned above may be obtained by converting the parallax information for each of the blocks in the distance image 128 to the three-dimensional positional information with the use of a so-called stereo method. In this implementation, the stereo method refers to a method of deriving, from the parallax of the object, the relative distance of the relevant object with respect to the image-capturing units 110, with the use of triangulation.

Moreover, the vehicle exterior environment recognition apparatus 120 may set a barrier of a predetermined width at a predetermined position of the object identified. The vehicle exterior environment recognition apparatus 120 may make the collision avoidance determination with the barrier thus set. The vehicle exterior environment recognition apparatus 120 may perform a control to avoid collision with the barrier, i.e., a braking control, in response to the result of the collision avoidance determination that the collision is unavoidable, and thereby avoid the collision with the object. In this implementation, the barrier to be set is devoid of avoidability by the own vehicle 1 with use of a traveling mode. The traveling mode may include any traveling state, e.g., straight traveling and turning, except for a mode in which the own vehicle 1 stops by braking. In other words, the collision avoidance determination with the barrier may be a determination as to whether or not the barrier is avoidable without braking.

The vehicle controller 130 may control the own vehicle 1 by accepting an operation input of the driver through a steering wheel 132, an accelerator pedal 134, and a brake pedal 136 and transmitting the operation input to a steering mechanism 142, a drive mechanism 144, and a brake mechanism 146. Moreover, in order to avoid the collision with the barrier set, the vehicle controller 130 may control the brake mechanism 146, and thereby make an emergency brake operation (i.e., automatic emergency braking (AEB)), in accordance with instructions from the vehicle exterior environment recognition apparatus 120.

[Vehicle Exterior Environment Recognition Apparatus 120]

Figure 3:
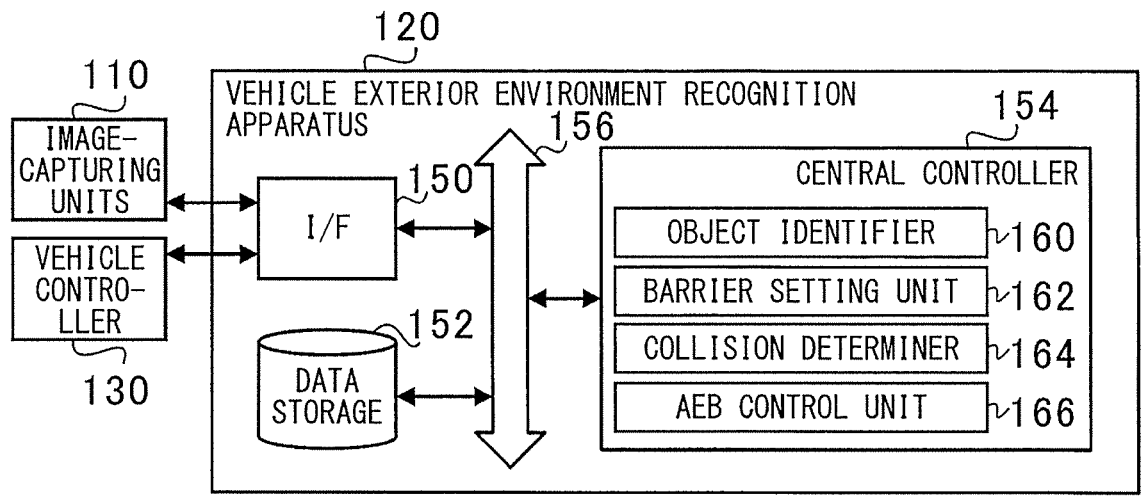
FIG. 3 is a functional block diagram illustrating schematic functions of a vehicle exterior environment recognition apparatus.

FIG. 3 is a functional block diagram illustrating schematic functions of the vehicle exterior environment recognition apparatus 120. Referring to FIG. 3, the vehicle exterior environment recognition apparatus 120 may include an interface (I/F) 150, a data storage 152, and a central controller 154.

The interface 150 may be an interface that exchanges information bi-directionally between devices including, without limitation, the image-capturing units 110 and the vehicle controller 130. The data storage 152 may include a random access memory (RAM), a flash memory, a hard disk drive (HDD), or any other suitable storage device. The data storage 152 may store various pieces of information necessary for processes to be carried out by the functional blocks to be described hereinafter.

The central controller 154 may include a semiconductor integrated circuit, and control devices including, without limitation, the interface 150 and the data storage 152 through a system bus 156. The semiconductor integrated circuit may have devices such as, but not limited to, a central processing unit (CPU), a read only memory (ROM) in which programs, etc., are stored, and a random access memory (RAM) serving as a work area. In this implementation, the central controller 154 may function as an object identifier 160, a barrier setting unit 162, a collision determiner 164, and an AEB control unit 166. In the following, a detailed description is given, on the basis of operation of each functional block of the central controller 154 as well, of a vehicle exterior environment recognition process that involves, as a feature of the implementation, collision avoidance.

[Vehicle Exterior Environment Recognition Process]

Figure 4:
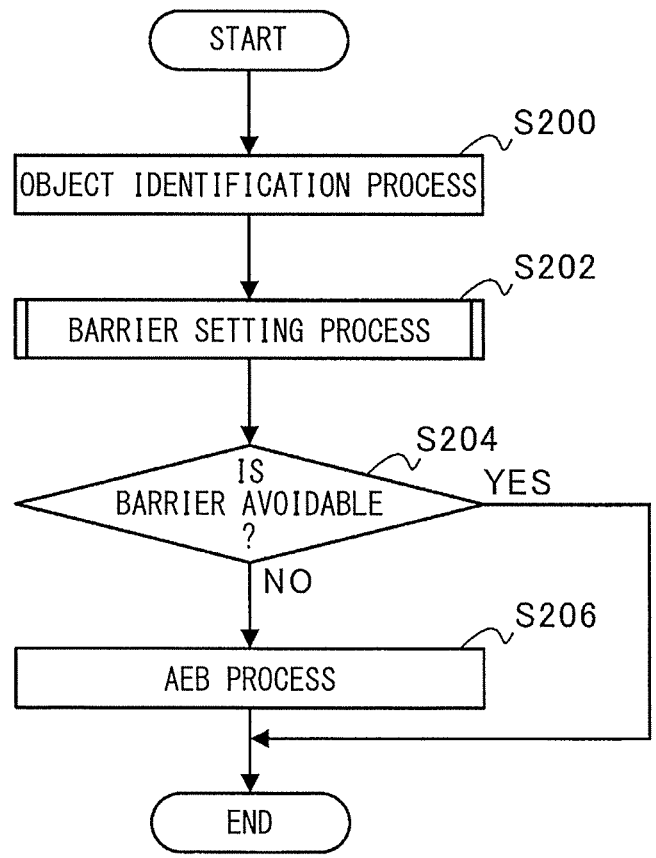
FIG. 4 is a flowchart illustrating an example of a flow of a vehicle exterior environment recognition process.

FIG. 4 is a flowchart illustrating an example of a flow of the vehicle exterior environment recognition process. The vehicle exterior environment recognition process may involve execution of the following processes: an object identification process (S200); a barrier setting process (S202); a collision determination process (S204); and an AEB process (S206). The object identifier 160 may perform the object identification process (S200) that includes identifying the object in the detected region. The barrier setting unit 162 may perform the barrier setting process (S202) that includes setting the barrier of the predetermined width at the predetermined position of the object. The collision determiner 164 may perform the collision determination process (S204) that includes determining whether or not the own vehicle 1 is able to avoid the barrier without braking. In a case where a determination is made that the own vehicle 1 is able to avoid the barrier without braking (YES in S204), the vehicle exterior environment recognition process is terminated. In a case where a determination is made that the own vehicle 1 is not able to avoid the barrier without braking (NO in S204), the AEB control unit 166 may perform the AEB process (S206) that includes allowing the vehicle controller 130 to make the emergency brake operation.

In one implementation, the object identification process (S200) may serve as "identifying an object". In one implementation, the barrier setting process (S202) may serve as "setting a barrier".

[Object Identification Process S200]

As described, the object identifier 160 may acquire the luminance image 126 and the distance image 128, and identify the object in the detected region with the use of the luminance image 126 and the distance image 128. Non-limiting examples of the objects may include a preceding vehicle, a person, a bicycle, a building such as a house, and any other thing with which the own vehicle 1 may possibly collide.

[Barrier Setting Process S202]

Figure 5:
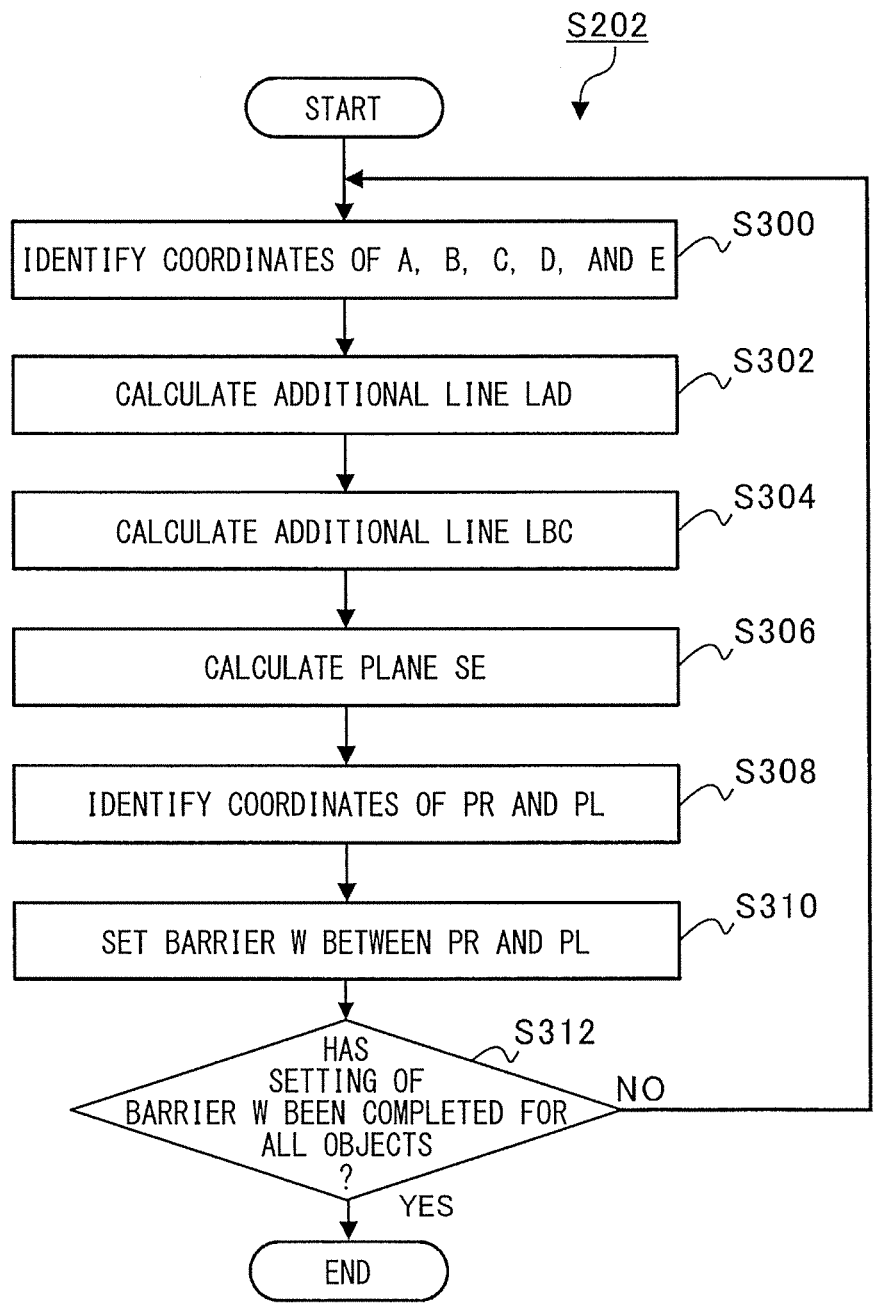
FIG. 5 is a flowchart illustrating an example of a flow of a barrier setting process.
Figure 6:
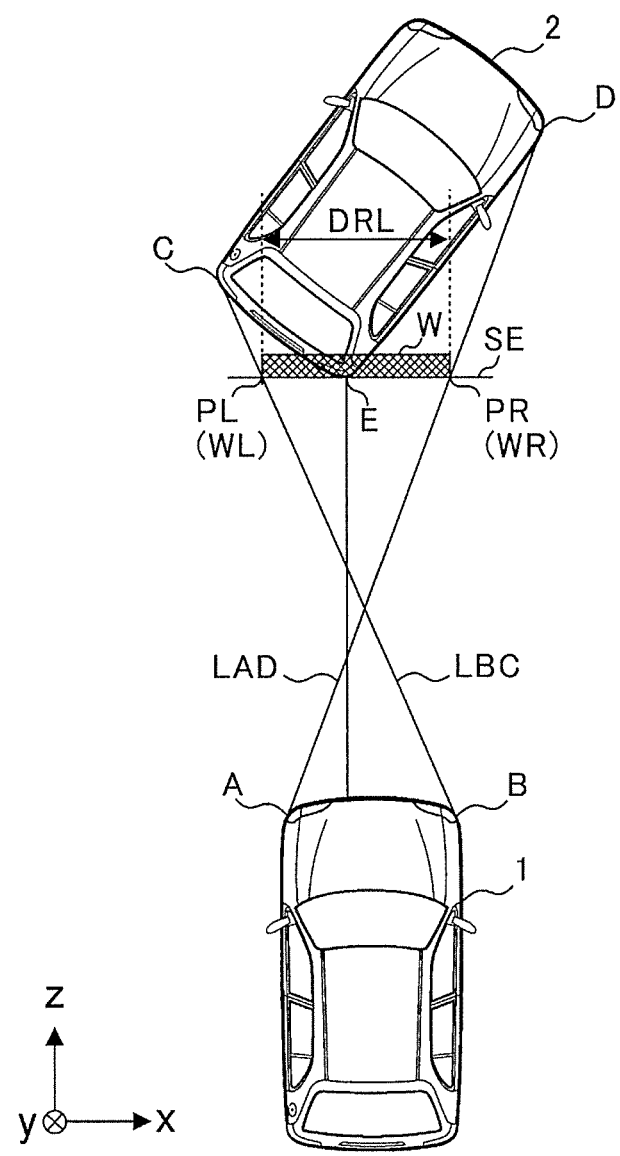
FIG. 6 is a top view of an own vehicle and an object and describes an example of the barrier setting process.

FIG. 5 is a flowchart illustrating an example of a flow of the barrier setting process S202. FIG. 6 is a top view of the own vehicle 1 and the object 2, describing the barrier setting process S202. In FIG. 6, the object 2 is a preceding vehicle. The preceding vehicle is present in a posture directed right obliquely frontward with respect to the own vehicle 1. In this implementation, the concept of the presence of the preceding vehicle includes both a case where the preceding vehicle is stopped and a case where the preceding vehicle is traveling. Note that a horizontal direction, i.e., a vehicle widthwise direction, with reference to the own vehicle 1 is referred to as an X direction. A vertical direction with reference to the own vehicle 1 is referred to as a Y direction. A depthwise direction, i.e., the traveling direction, with reference to the own vehicle 1 is referred to as a Z direction.

The barrier setting unit 162 may, first, identify coordinates in an X-Z plane of a front left end A of the own vehicle 1, a front right end B of the own vehicle 1, a left end C of the object 2, a right end D of the object 2, and a closest end E of the object 2 (S300). The coordinates of the front left end A of the own vehicle 1 and the front right end B of the own vehicle 1 may be identified on the basis of a vehicle width of the own vehicle 1. The vehicle width of the own vehicle 1 may be stored in advance.

In one implementation, the process of identifying the coordinates (S300) may serve as "identifying coordinates".

The left end C and the right end D of the object 2 may be a left end and right end of the object 2 as visually recognized from the own vehicle 1. In other words, the left end C and the right end D of the object 2 are not absolute ends of the object 2 but relative ends of the object 2 as viewed from the own vehicle 1. Regarding the left end C of the object 2, a position of the left end C may be identified from the luminance image 126. A relative distance of the left end C in the Z direction with respect to the own vehicle 1 may be identified on the basis of the parallax information of a block corresponding to the left end C in the distance image 128. Moreover, a relative distance of the left end C in the X direction with respect to the own vehicle 1 may be identified on the basis of a horizontal position of the block corresponding to the left end C in the distance image 128. Thus, the coordinates of the left end C in the real space may be identified. Similarly, regarding the right end D of the object 2, a position of the right end D may be identified on the basis of the luminance image 126. A relative distance of the right end D in the Z direction with respect to the own vehicle 1 may be identified on the basis of the parallax information of a block corresponding to the right end D in the distance image 128. Moreover, a relative distance of the right end D in the X direction with respect to the own vehicle 1 may be identified on the basis of a horizontal position of the block corresponding to the right end D in the distance image 128. Thus, the coordinates of the right end D in the real space may be identified.

The closest end E of the object 2 may be a part of the object 2 where the relative distance in the Z direction with respect to the own vehicle 1 is shortest. Out of the blocks of the object 2, a block with the smallest relative distance in the Z direction with respect to the own vehicle 1 may be identified as the closest end E of the object. The relative distance in the Z direction with respect to the own vehicle 1 may be calculated on the basis of the parallax information. A relative distance of the closest end E in the Z direction with respect to the own vehicle 1 may be identified on the basis of the parallax information of the block identified. A relative distance of the closest end E in the X direction with respect to the own vehicle 1 may be identified on the basis of a horizontal position of the block identified. Thus, the coordinates of the closest end E in the real space may be identified.

Thereafter, the barrier setting unit 162 may calculate an additional line LAD that couples the front left end A of the own vehicle 1 and the right end D of the object 2 (S302). The calculation of the additional line LAD may be made on the basis of the coordinates of the front left end A of the own vehicle 1 and the coordinates of the right end D of the object 2. The additional line LAD indicates how much the own vehicle 1 ought to move rightward, i.e., how much the own vehicle 1 ought to turn rightward, in order to avoid the object 2.

In one implementation, the additional line LAD may serve as a "first additional line". In one implementation, the process of calculating the additional line LAD (S302) may serve as "calculating a first additional line".

Thereafter, the barrier setting unit 162 may calculate an additional line LBC that couples the front right end B of the own vehicle 1 and the left end C of the object 2 (S304). The calculation of the additional line LBC may be made on the basis of the coordinates of the front right end B of the own vehicle 1 and the coordinates of the left end C of the object 2. The additional line LBC indicates how much the own vehicle 1 ought to move leftward, i.e., how much the own vehicle 1 ought to turn leftward, in order to avoid the object 2.

In one implementation, the additional line LBC may serve as a "second additional line". In one implementation, the process of calculating the additional line LBC (S304) may serve as "calculating a second additional line".

Thereafter, the barrier setting unit 162 may calculate a plane SE that includes the closest end E and is perpendicular to the traveling direction of the own vehicle 1, i.e., the Z direction (S306). The calculation of the plane SE may be made on the basis of the coordinates of the closest end E.

In one implementation, the process of calculating the plane SE (S306) may serve as "calculating a plane".

Thereafter, the wall setting unit 162 may identify coordinates of an intersection point PR of the plane SE with the additional line LAD, and an intersection point PL of the plane SE with the additional line LBC (S308). The identification of the coordinates of the intersection point PR may be made on the basis of the additional line LAD and the plane SE. The identification of the coordinates of the intersection point PL may be made on the basis of the additional line LBC and the plane SE.

In one implementation, the intersection point PR may serve as a "first intersection point". In one implementation, the intersection point PL may serve as a "second intersection point". In one implementation, the process of identifying the coordinates of the intersection point PR and the coordinates of the intersection point PL (S308) may serve as "calculating a first intersection point and a second intersection point".

Thereafter, the barrier setting unit 162 may set the barrier W between the intersection point PR and the intersection point PL (S310). In one specific but non-limiting example, the barrier setting unit 162 may set the barrier W that is located at a position of the closest end E in a perpendicular posture to the traveling direction, and has a barrier width of a distance DRL from the intersection point PR to the intersection point PL. In other words, the barrier W may be, for example, a virtual, upright plane, or a plane perpendicular to the ground. A right end WR of the barrier W may include the intersection point PR, while a left end WL of the barrier W may include the intersection point PL. For an easier understanding of the barrier W, FIG. 6 illustrates the barrier W in the form of a cross-hatched region, which may make an impression that the barrier W has a thickness in the Z direction. However, actually, the barrier W is a plane, and is assumed not to have any thickness in the Z direction.

In one implementation, the process of setting the barrier W (S310) may serve as "setting the barrier".

Thereafter, the barrier setting unit 162 may determine whether or not the setting of the barrier W has been completed for all the objects 2 (S312). In a case where the setting of the barrier W has been completed for all the objects 2 (YES in S312), the barrier setting unit 162 may terminate the barrier setting process S202. In a case where the setting of the barrier W has not been completed for all the objects 2 (NO in S312), the barrier setting unit 162 may repeat the barrier setting process S202, targeting at the object 2 that has not been subjected to the setting of the barrier W (S300).

In this way, the barrier setting unit 162 may set the barrier W for all the objects 2 in the detected region 124. The barrier W may be set at the predetermined position, i.e., the position of the closest end E, and with the predetermined width, i.e., the distance DRL.

[Collision Determination Process S204]

The collision determiner 164 may determine whether or not the own vehicle 1 is able to avoid the barrier W without braking, regarding all the barriers W set in the barrier setting process S202. In one specific but non-limiting example, the collision determiner 164 may, first, determine whether or not the own vehicle 1 is able to pass by, without braking, on right side of the right end WR of the barrier W, without coming into contact with the barrier W. Thereafter, the collision determiner 164 may determine whether or not the own vehicle 1 is able to pass by, without braking, on left side of the left end WL of the barrier W, without coming into contact with the barrier W. In other words, a determination may be made as to whether or not the own vehicle 1 is able to turn rightward or leftward at a later time, to avoid the barrier W. In a case where a determination has been made that the own vehicle 1 is not able to pass by on the right side of the right end WR, and a determination has been made that the own vehicle 1 is not able to pass by on the left side of the left end WL, the collision determiner 164 may determine that the own vehicle 1 is not able to avoid the barrier W without braking. For specific calculation on the determination as to whether or not the own vehicle 1 is able to pass by on the right side of the right end WR, and the determination as to whether or not the own vehicle 1 is able to pass by on the left side of the left end WL, existing collision determination techniques may be employed.

[AEB Process S206]

In a case with the determination that the own vehicle 1 is not able to avoid the barrier W without braking, the AEB control unit 166 may transmit a signal indicating an instruction on AEB operation, to the vehicle controller 130. Upon receiving the signal indicating the instruction on the AEB operation, the vehicle controller 130 may control the brake mechanism 146 to make the emergency brake operation. Thus, the own vehicle 1 may stop before colliding with the barrier W, to avoid the collision with the barrier W, i.e., the object 2.

[Variations in Objects]

Figure 7:
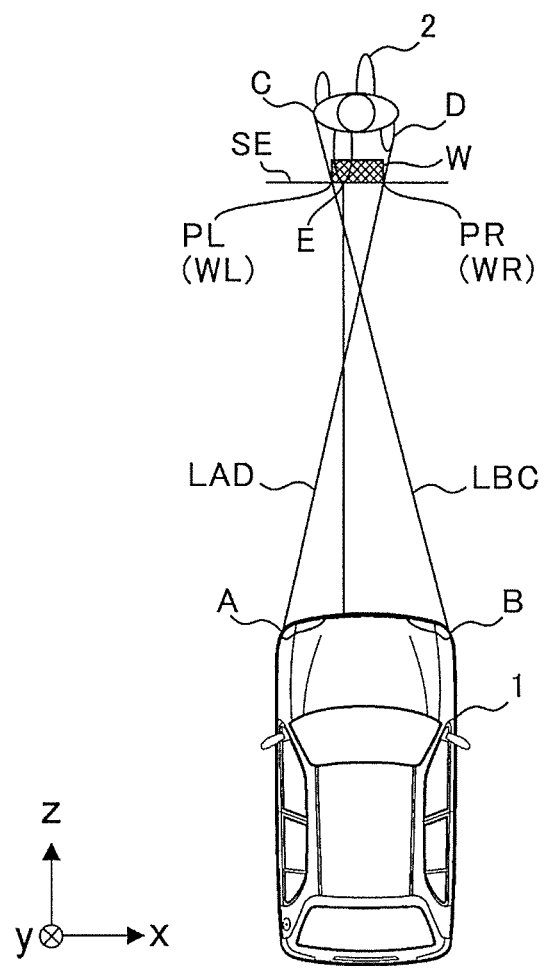
FIG. 7 is a schematic diagram, with a variation in the object.
Figure 8:
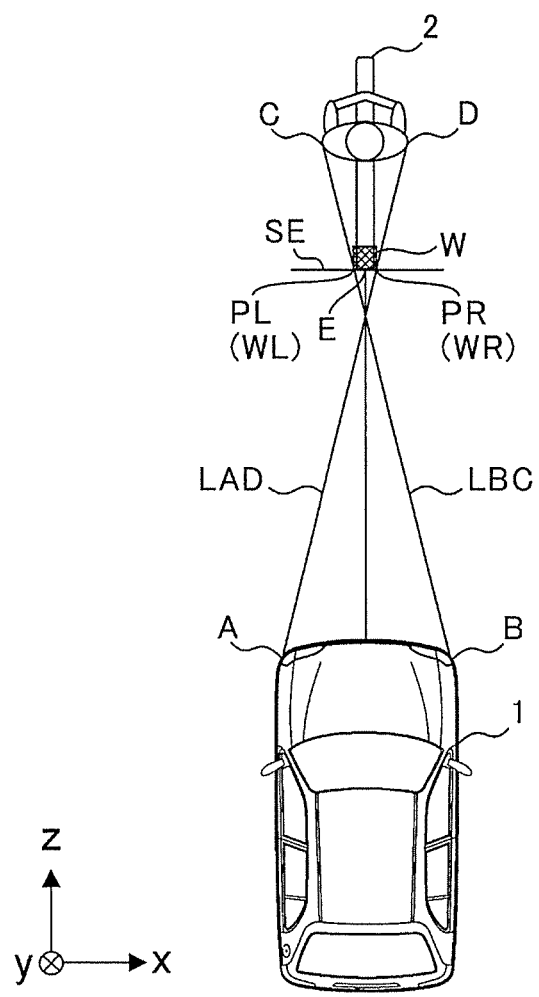
FIG. 8 is a schematic diagram, with a variation in the object.
Figure 9:
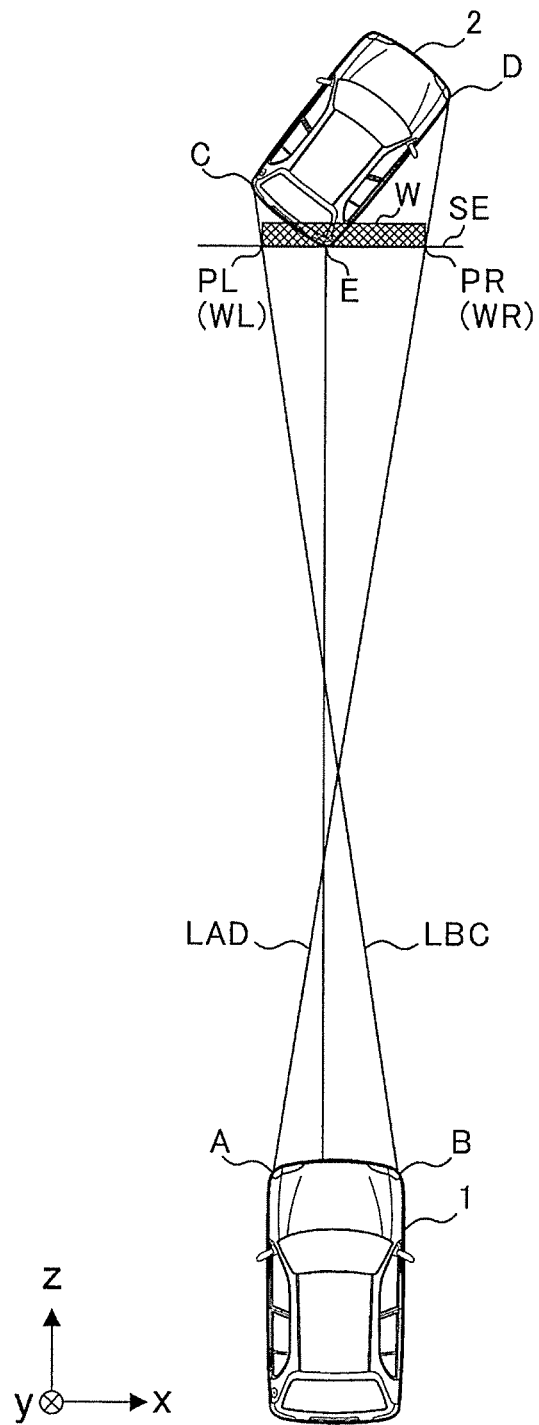
FIG. 9 is a schematic diagram, with a variation in the object.
Figure 10:
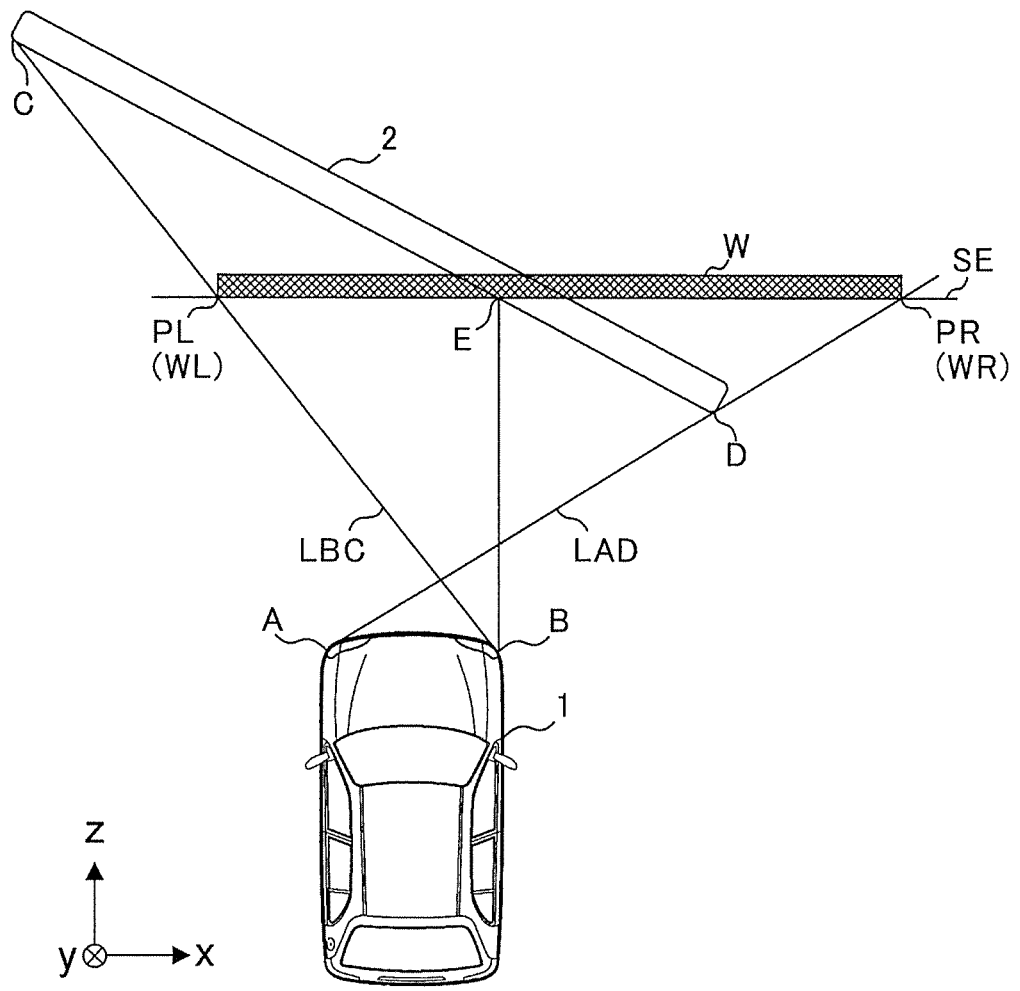
FIG. 10 is a schematic diagram, with a variation in the object.

FIGS. 7 to 10 schematically illustrate cases with variations in the object 2. FIG. 7 illustrates a case with a pedestrian as the object 2. FIG. 8 illustrates a case with a bicycle as the object 2. FIG. 9 illustrates a case where the object 2 is farther away from the own vehicle 1 than in FIG. 6. FIG. 10 illustrates a case where the object 2 is a building that extends from right front to left obliquely frontward, e.g., a wall of a house. Even if the object 2 is varied as in FIGS. 7 to 10, the barrier setting unit 162 may set the barrier W in a similar setting method to the case in FIG. 6 where the object 2 is the preceding vehicle.

For example, in the case of FIG. 10, the barrier setting unit 162 may set the barrier W, at the closest end E of the object 2 with the smallest relative distance in the Z direction with respect to the own vehicle 1. The barrier W may be so set as to be shifted rightward with respect to the own vehicle 1. In this case, the own vehicle 1 is able to avoid the barrier W more easily by traveling on the left side of the left end WL of the barrier W, than by traveling on the right side of the right end WR of the barrier W. Accordingly, no emergency brake operation is made, insofar as the own vehicle 1 is able to avoid the barrier W by traveling on the left side of the left end WL of the barrier W.

Moreover, the vehicle exterior environment recognition apparatus 120 may repetitively perform the vehicle exterior environment recognition process from moment to moment. Thus, the position and the width of the barrier W set on the object 2 change from moment to moment. The collision determination is made on each occasion, to decide whether or not to make the emergency brake operation. For example, in a case where the own vehicle 1 turns leftward from the state in FIG. 10, an angle of inclination of a direction of extension of the object 2 with respect to the traveling direction of the own vehicle 1 becomes smaller. This causes the barrier W to be shifted more rightward with respect to the own vehicle 1. In a case where the own vehicle 1 continues turning leftward and avoids the collision with the object 2, no emergency brake operation is made during the turn.

[Effects]

Figure 11A:
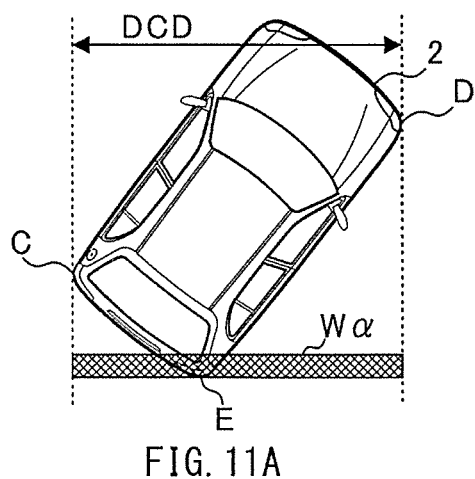
FIGS. 11A, 11B, 11C, and 11D are provided for description of effects of the vehicle exterior environment recognition apparatus.
Figure 11B:
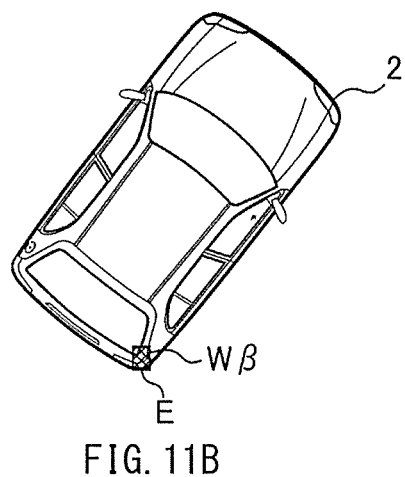
Figure 11C:
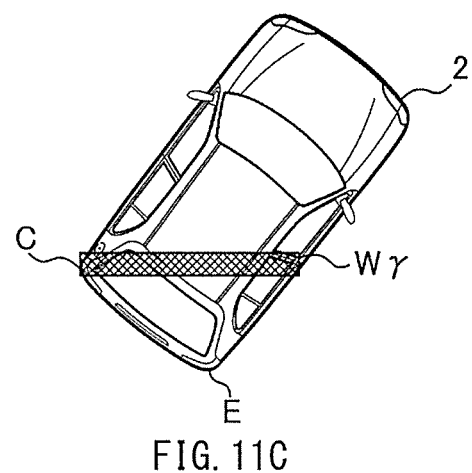
Figure 11D:
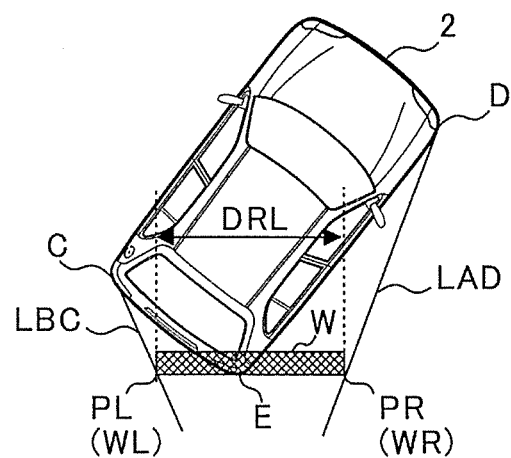

FIGS. 11A, 11B, 11C, and 11D are provided for description of effects of the vehicle exterior environment recognition apparatus 120. FIGS. 11A to 11C illustrate reference examples to this implementation. FIG. 11D illustrates this implementation. In FIGS. 11A to 11D, the object 2 is a preceding vehicle. The preceding vehicle is present in a posture directed right obliquely frontward with respect to the own vehicle 1.

In the example of FIG. 11A, a barrier Wα is set at the position of the closest end E. A barrier width of the barrier Wα is equal to a distance DCD from the left end C of the object 2 to the right end D of the object 2. In a case where the own vehicle 1 tries to pass by on the right side of the preceding vehicle as the object 2, and approaches the right side of the preceding vehicle, a determination is made that the own vehicle 1 is not able to avoid the barrier Wα, because the barrier Wα is set on the right side of the preceding vehicle. This may result in possibility of the emergency brake operation. Accordingly, this example involves possibility that the emergency brake operation is excessively made, even though the own vehicle 1 is able to safely pass by the object 2.

In the example in FIG. 11B, a barrier Wβ is set at the position of the closest end E. A barrier width of the barrier Wβ is equal to a width of a block including the closest end E. Because the preceding vehicle as the object 2 is present in a posture inclined right obliquely frontward, the closest end E is located at a part of a rear surface of the preceding vehicle. It follows that the barrier width of the barrier Wβ is smaller than that of the barrier W according to this implementation. Thus, the determination that the own vehicle 1 is not able to avoid the barrier Wβ is not made until the own vehicle 1 comes significantly close to the barrier Wβ. Accordingly, in this example, the emergency brake operation is postponed, causing possibility of a delay in avoiding the collision with the object 2 or a failure in avoiding the collision with the object 2.

In the example in FIG. 11C, a barrier Wγ is set at a position of the left end C of the object 2. A barrier width of the barrier Wγ is equal to a width of a cross-section of the object 2 taken along a plane perpendicular to the traveling direction. Because the preceding vehicle as the object 2 is present in the posture inclined right obliquely frontward, the barrier Wγ is located ahead of the closest end E. In other words, the barrier Wγ is located farther away from the own vehicle than the closest end E is. Accordingly, in this example, there is possibility that the own vehicle 1 comes into contact with the closest end E before avoiding the barrier Wγ, or possibility that the own vehicle 1 comes into contact with the closest end E before stopping by emergency braking.

In contrast to the reference examples illustrated in FIGS. 11A to 11C, in this implementation illustrated in FIG. 11D, the barrier W is set at the position of the closest end E. The barrier W includes the intersection point PR on the right end WR, and the intersection point PL on the left end WL. Because the right end WR is located on the additional line LAD, the own vehicle 1 is able to pass by on the right side of the object 2 without coming into contact with the right end D of the object 2, insofar as the own vehicle 1 is able to pass by on the right side of the right end WR of the barrier W. Similarly, because the left end WL is located on the additional line LBC, the own vehicle 1 is able to pass by on the left side of the object 2 without coming into contact with the left end C of the object 2, insofar as the own vehicle 1 is able to pass by on the left side of the left end WL of the barrier W.

Moreover, in this implementation, in the collision determination process S204, in the case where the determination is made that the own vehicle 1 is not able to avoid the barrier W without braking, the emergency brake operation is made by the AEB process S206. Because the barrier W is located at the position of the closest end E of the object 2, the own vehicle 1 is able to stop before coming into contact with the object 2, by stopping before reaching the barrier W by the emergency braking.

Furthermore, in this implementation, the right end WR of the barrier W is located on the additional line LAD. Accordingly, the own vehicle 1 is able to pass by on the right side of the object 2, insofar as the own vehicle 1 is able to pass by on the right side of the right end WR of the barrier W. The own vehicle 1 is not able to pass by on the right side of the object 2, insofar as the own vehicle 1 is not able to pass by on the right side of the right end WR of the barrier W. Similarly, the left end WL of the barrier W is located on the additional line LBC. Accordingly, the own vehicle 1 is able to pass by on the left side of the object 2, insofar as the own vehicle 1 is able to pass by on the left side of the left end WL of the barrier W. The own vehicle 1 is not able to pass by on the left side of the object 2, insofar as the own vehicle 1 is not able to pass by on the left side of the left end WL of the barrier W. Thus, this implementation saves making the emergency brake operation excessively in the case where the own vehicle 1 is able to pass by safely the object 2, i.e., in the case where possibility of the collision is considerably low.

Hence, the vehicle exterior environment recognition apparatus 120 in this implementation is able to appropriately set information involved in the collision avoidance determination with the object, i.e., the barrier W, regardless of the posture of the object such as the preceding vehicle. As a result, it is possible to reduce the deviation of the result of the collision avoidance determination from the presence or the absence of the actual collision. It is possible to make the emergency brake operation appropriately.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In one implementation described above, the barrier setting unit 162 identifies the coordinates of the left end C, the right end D, and the closest end E of the object 2, with the use of the distance image 128. However, a specific mode of identifying the coordinates of the left end C, the right end D, and the closest end E of the object 2 is not limited to as mentioned above. For example, the barrier setting unit 162 may identify the coordinates of the left end C, the right end D, and the closest end E of the object 2, with the use of radar.

In one implementation described above, the barrier setting unit 162 obtains the additional line LAD, the additional line ABC, and the plane SE in this order, and obtains the intersection point PR and the intersection point PL. However, the order of calculation of the additional line LAD, the additional line LBC, and the plane SE is not limited to as mentioned above. It suffices to calculate the intersection point PR and the intersection point PL.

The implementation also provides a program that causes a computer to function as the vehicle exterior environment recognition apparatus 120, and a non-transitory recording medium that stores the program. The non-transitory recording medium is computer readable. Non-limiting examples of the non-transitory recording medium may include a flexible disk, a magneto-optical disk, ROM, CD, DVD (Registered Trademark), and BD (Registered Trademark). As used herein, the term "program" may refer to a data processor written in any language and any description method.

A part or all of the processes in the vehicle exterior environment recognition process as disclosed herein does not necessarily have to be processed on a time-series basis in the order described in the example flowchart. A part or all of the processes in the vehicle exterior environment recognition process may involve parallel processing or processing based on subroutine.

The central controller 154 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the central controller 154 illustrated in FIG. 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle exterior environment recognition apparatus, comprising:
    an object identifier configured to identify an object in a detected region ahead of an own vehicle; and
    a barrier setting unit configured to set a barrier located at a closest end of the object, with a relative distance from the object to the own vehicle in a traveling direction of the own vehicle being shortest at the closest end, the barrier being unavoidable by the own vehicle with use of a traveling mode of the own vehicle, wherein the barrier is a plane that includes the closest end and is perpendicular to the traveling direction of the own vehicle, the barrier including a right end and a left end, the right end including an intersection point with a first additional line that couples a front left end of the own vehicle to a right end of the object, and the left end including an intersection point with a second additional line that couples a front right end of the own vehicle to a left end of the object.

2. The vehicle exterior environment recognition apparatus according to claim 1,
wherein the barrier setting unit identifies coordinates of the right end of the object, the left end of the object, and the closest end, with use of a luminance image and a distance image, the luminance image being generated by an image capturing unit that captures an image of vehicle exterior environment, and the distance image being generated from the luminance image, with parallax information being associated with the distance image.

3. A vehicle exterior environment recognition method, comprising:
identifying an object in a detected region ahead of an own vehicle; and
setting a barrier located at a closest end of the object, with a relative distance from the object to the own vehicle in a traveling direction of the own vehicle being shortest at the closest end, the barrier being unavoidable by the own vehicle with use of a traveling mode of the own vehicle; and
performing a braking operation to avoid collision with the object based on the barrier being unavoidable with the use of the traveling mode of the own vehicle,
wherein the barrier is a plane that includes the closest end and is perpendicular to the traveling direction of the own vehicle, the barrier including a right end and a left end, the right end including an intersection point with a first additional line that couples a front left end of the own vehicle to a right end of the object, and the left end including an intersection point with a second additional line that couples a front right end of the own vehicle to a left end of the object.

4. The vehicle exterior environment recognition method according to claim 3, wherein the setting of the barrier further includes
identifying coordinates of the right end of the object, the left end of the object, and the closest end, with use of a luminance image and a distance image, the luminance image being generated by an image capturing unit that captures an image of vehicle exterior environment, and the distance image being generated from the luminance image, with parallax information being associated with the distance image.

5. A vehicle exterior environment recognition apparatus, comprising
circuitry configured to
identify an object in a detected region ahead of an own vehicle, and
set a barrier located at a closest end of the object, with a relative distance from the object to the own vehicle in a traveling direction of the own vehicle being shortest at the closest end, the barrier being unavoidable by the own vehicle with use of a traveling mode of the own vehicle,
wherein the barrier is a plane that includes the closest end and is perpendicular to the traveling direction of the own vehicle, the barrier including a right end and a left end, the right end including an intersection point with a first additional line that couples a front left end of the own vehicle to a right end of the object, and the left end including an intersection point with a second additional line that couples a front right end of the own vehicle to a left end of the object.

* * * * *